United States Patent
Zheng et al.

(10) Patent No.: US 11,520,769 B1
(45) Date of Patent: Dec. 6, 2022

(54) BLOCK LEVEL LOCK ON DATA TABLE

(71) Applicant: International Business Machines Corporation, Armonk, NY (US)

(72) Inventors: Li Fei Zheng, Shanghai (CN); Di Jin, Beijing (CN); Min Fang, Beijing (CN); Ye Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 17/358,408

(22) Filed: Jun. 25, 2021

(51) Int. Cl.
 *G06F 16/00* (2019.01)
 *G06F 16/23* (2019.01)

(52) U.S. Cl.
 CPC ...... *G06F 16/2343* (2019.01); *G06F 16/2365* (2019.01); *G06F 16/2379* (2019.01)

(58) Field of Classification Search
 None
 See application file for complete search history.

(56) References Cited

U.S. PATENT DOCUMENTS

| | | | |
|---|---|---|---|
| 5,285,528 A | | 2/1994 | Hart |
| 5,440,732 A | * | 8/1995 | Lomet ............ G06F 16/2246 |
| 2005/0149562 A1 | * | 7/2005 | Browne ........... G06F 16/2453 |
| 2009/0276430 A1 | | 11/2009 | Bruso |
| 2011/0131192 A1 | | 6/2011 | Finnie |
| 2011/0208704 A1 | | 8/2011 | Graefe |
| 2013/0060742 A1 | * | 3/2013 | Chang ............. G06F 16/1774 |
| | | | 707/704 |
| 2015/0019739 A1 | | 1/2015 | Attaluri |

FOREIGN PATENT DOCUMENTS

WO  2015116208 A1  8/2015

OTHER PUBLICATIONS

Mell, et al., "The NIST Definition of Cloud Computing", Recommendations of the National Institute of Standards and Technology, National Institute of Standard and Technology, U.S. Department of Commerce, Sep. 2011, 7 pgs., Special Publication 800-145, Gaithersburg, MD, USA.

* cited by examiner

*Primary Examiner* — Syed H Hasan
(74) *Attorney, Agent, or Firm* — David B. Woycechowsky

(57) ABSTRACT

Embodiments of the present disclosure relate to a method, system, and computer program product for block level lock on a data table. According to the method, in response to first transactional processing to be applied on a data table, one or more processors determine that first target data to be accessed during execution of the first transactional processing is comprised in a continuous range of data in the data table. One or more processors determine whether a block lock is available for locking the continuous range of data for the first transactional processing. In accordance with a determination that the block lock is available, one or more processors grant the first transactional processing with the block lock, the block lock being associated with lock information indicating the continuous range of data.

18 Claims, 11 Drawing Sheets

710

LOCK COMPATIBILITY
BETWEEN CHILD LOCK TYPES

|   | S | U | X |
|---|---|---|---|
| S | ✓ | ✓ | ✗ |
| U | ✓ | ✗ | ✗ |
| X | ✗ | ✗ | ✗ |

720

LOCK COMPATIBILITY BETWEEN PARENT
LOCK TYPES

|     | IS | IX | S | U | SIX | X |
|-----|----|----|---|---|-----|---|
| IS  | ✓  | ✓  | ✓ | ✓ | ✓   | ✗ |
| IX  | ✓  | ✓  | ✗ | ✗ | ✗   | ✗ |
| S   | ✓  | ✗  | ✓ | ✓ | ✗   | ✗ |
| U   | ✓  | ✗  | ✓ | ✗ | ✗   | ✗ |
| SIX | ✓  | ✗  | ✗ | ✗ | ✗   | ✗ |
| X   | ✗  | ✗  | ✗ | ✗ | ✗   | ✗ |

✓ COMPATIBLE

✗ INCOMPATIBLE

BLOCK LEVEL LOCK ON DATA TABLE

BACKGROUND

The present disclosure generally relates to database management techniques and more particularly to a block level lock on a data table.

Databases are computerized information storage and retrieval systems. Data stored in a database is often viewed as one or more data tables. Many software applications involve multiple transactions seeking access to a data table. A database management system (DBMS) underlies the application and controls access to the shared data tables in order to maintain database consistency.

System performance may be improved in multi-requester transaction processing from the applications by supporting concurrent and efficient processing of multiple requests. The system protects against data inconsistency by allowing only one requester at a time to change data in the data table. This control may be implemented by using a lock control. Typically, each transaction in a database places some type of lock on the data that are involved in the transaction.

SUMMARY

According to one embodiment, the present disclosure includes a computer-implemented method. According to the method, in response to first transactional processing to be applied on a data table, one or more processors determine that first target data to be accessed during execution of the first transactional processing is comprised in a continuous range of data in the data table. One or more processors determine whether a block lock is available for locking the continuous range of data for the first transactional processing. In accordance with a determination that the block lock is available, one or more processors grant the first transactional processing with the block lock, the block lock being associated with lock information indicating the continuous range of data.

According to a further embodiment, the present disclosure includes a system. The system comprises a processing unit; and a memory coupled to the processing unit and storing instructions thereon. The instructions, when executed by the processing unit, perform acts of the method according to the embodiment of the present disclosure.

According to yet a further embodiment, the present disclosure includes a computer program product being tangibly stored on a non-transient machine-readable medium and comprising machine-executable instructions. The instructions, when executed on a device, cause the device to perform acts of the method according to the embodiment of the present disclosure.

According to an aspect of the present invention, there is a method, computer program product and/or system that performs the following operations (not necessarily in the following order): (i) receiving a data table that includes a first continuous range of data; (ii) receiving a request to perform first transactional processing on the data table, with the request including information indicative of first target data to be accessed during performance of the first transactional processing; (iii) in response to receipt of the request, determining, by one or more processors, that first target data to be accessed during execution of the first transactional processing is included in the first continuous range of data in the data table; (iv) determining, by one or more processors, that a block lock is available for locking the first continuous range of data to permit performance of the first transactional processing; (v) responsive to the determination that the block lock is available, performing, by one or more processors, the first transactional processing using the block lock; and (vi) storing, in a manner associated the block lock, lock information indicating information indicative of the first continuous range of data.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
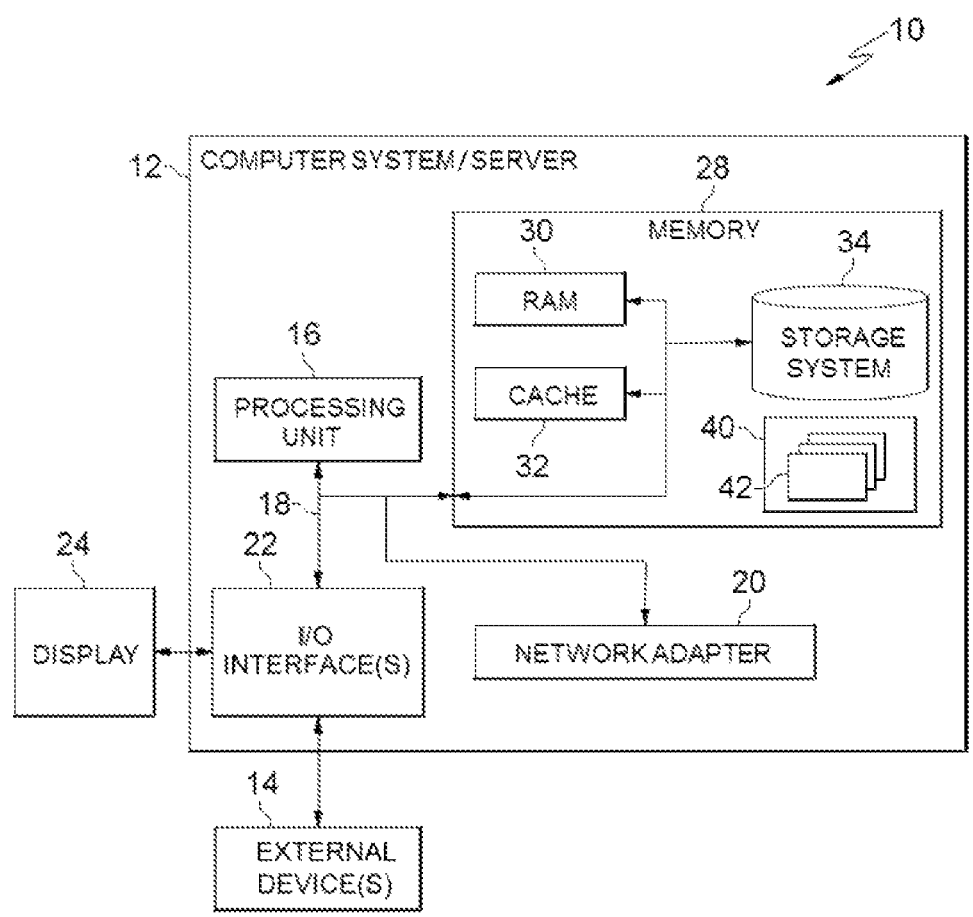
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
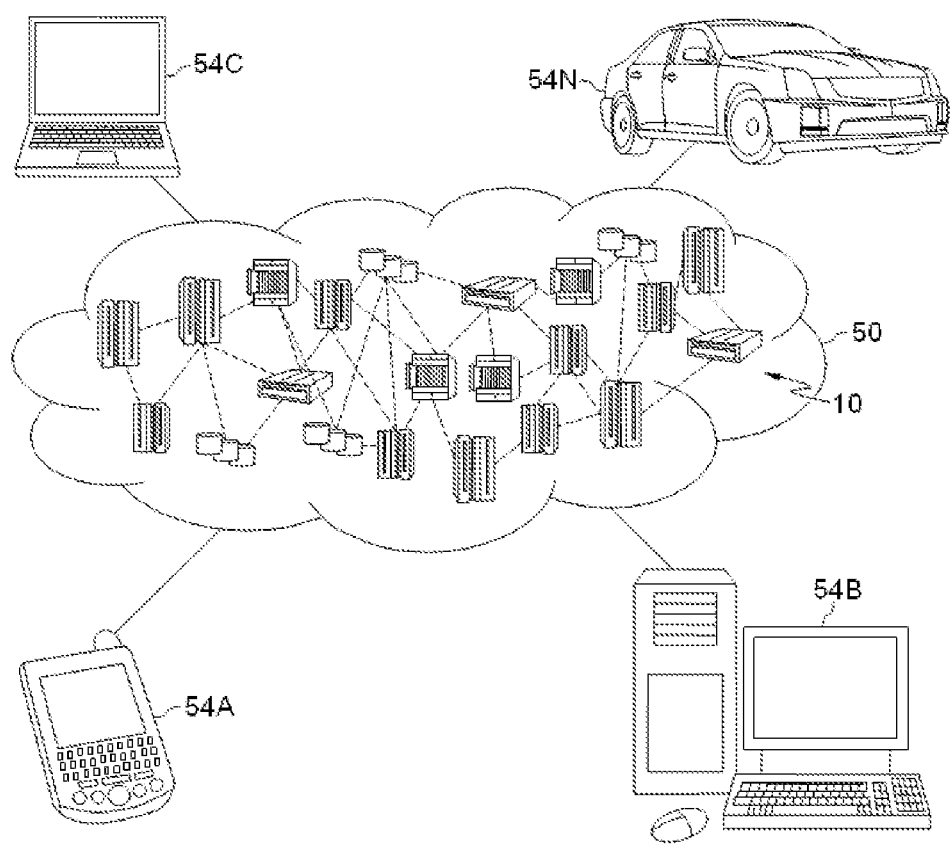
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
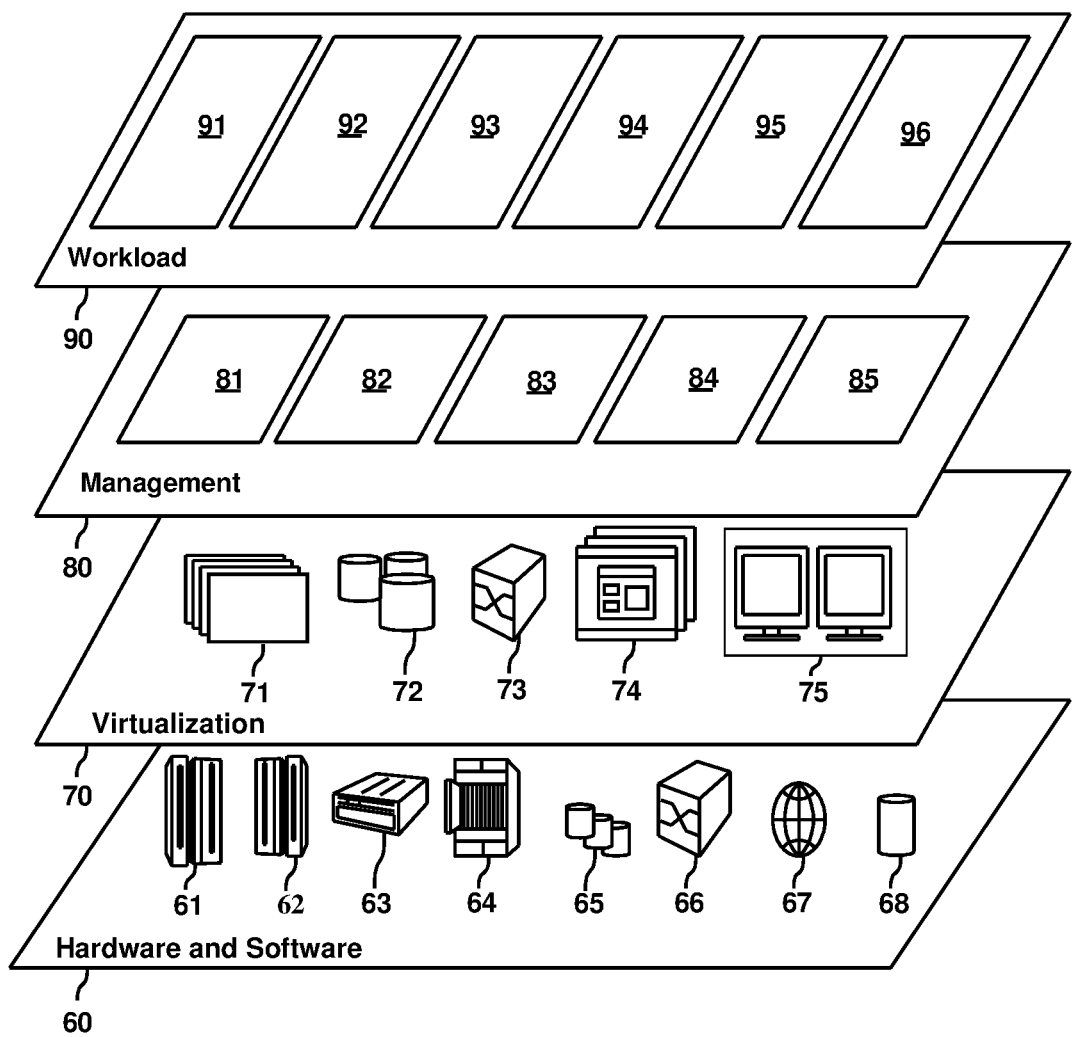
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and lock management 96. The functionalities of lock management 96 will be described in the following embodiment of the present disclosure.

Data stored in a database system, for example, a relational database, is often viewed as one or more tables. Each row of the table may be viewed as a record that contains logically related data elements, which are defined by columns. A data table stored in the database may be maintained in one or more files which may be divided into pages, and each page contains one or more rows (or records) of the data table.

During operation, transactional processing may be applied to one or more data tables. As used herein, the term "transactional processing" may be referred to a transaction or a batch of transactions (including more than one transaction). During execution of transactional processing, one or more access operations, such as an insert, update, and/or delete, are applied to access one or more data tables. As mentioned above, a lock control mechanism is applied in the database system to enable concurrent and efficient processing of multiple requests from multi-requester transaction processing.

Figure 4:
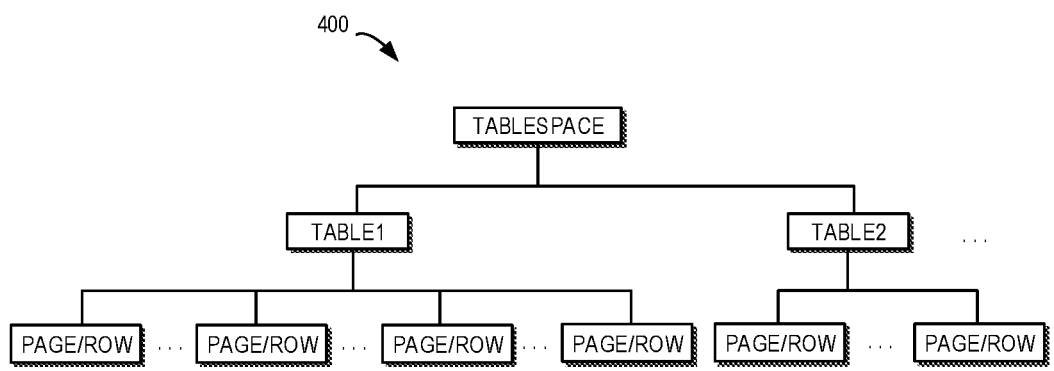
FIG. 4 depicts an example lock granularity hierarchy applied in a conventional database system.

FIG. 4 depicts an example lock granularity hierarchy 400 applied in a conventional database system. As shown, a coarsest granularity in lock granularity hierarchy 400 is a table space level block which is applied to lock a table space including one or more data tables stored in the database system. Lock granularity hierarchy 400 further comprises a table level block which is applied to lock a whole data table stored in the database system. A finer granularity is a page level lock and/or a row level lock which are configured to lock a single page or a single row respectively in a data table.

According to lock granularity hierarchy 400, a batch or transaction can either lock data at a table space/table level or at a page/row level. Different batches and transactions may need to access different data in a data table. For batches or transactions, a relatively large amount of data in a data table may be accessed during execution, which may need to either lock the whole table/table space or request locks on individual pages or rows to be accessed. However, on one hand, locking the whole table/table space completely may prevent other batches or transactions from accessing other data in the data table or tablespace, which may result in low concurrency with transaction processing. On the other hand, locking individual pages or rows may lead to a large number of lock requests and a lock release, thereby degrading the processing performance for the batch or transaction under processing.

According to example embodiments of the present disclosure, there is an improved solution for lock management. In this solution, a new type of lock is introduced to lock a continuous range of data in a data table. The continuous range of data is determined dynamically based on target data to be accessed during execution of transactional processing. By granting the new type of lock, it is possible to lock as much data as possible which will be accessed by transaction processing, and allow the remaining data to be unlocked for access by other transaction processing.

Other advantages of the present disclosure will be described with reference to the example embodiments and the accompanying drawings below.

Figure 5:
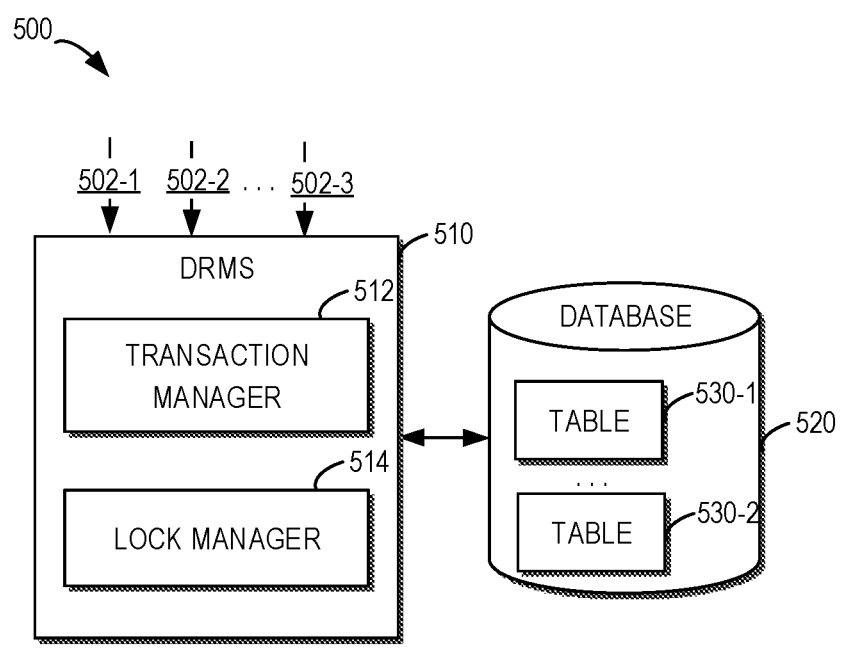
FIG. 5 depicts a high-level block diagram illustrating a database environment suitable for implementing embodiments of the present disclosure.

FIG. 5 depicts a high-level block diagram illustrating a database environment 500 suitable for implementing embodiments of the present disclosure. As shown, the environment 500 comprises a database management system (DBMS) 510 and a database (DB) 520. DBMS 520 is configured to perform data management on one or more data tables (including data tables 530-1 and 530-2) stored in database 520. For the purpose of discussion, data tables 530-1 and 530-2 are collectively or individually referred to as data tables 530.

In some embodiments, DBMS 510 may be implemented by computer system/server 12 of FIG. 1 or by multiple computer systems/servers in a distributed manner. In some embodiments, database 520 may build on massive storage devices. Database 520 may be any suitable type of database, including a relational database or a non-relational database.

DBMS 510 may receive one or more requests 502-1, 502-2, 502-3 for transaction processing applied to one or more data tables 530. For the purpose of discussion, the requests 502-1, 502-2, 502-3 are collectively or individually referred to as requests 502. In some cases, multiple requests for transactional processing are performed on one or more data tables 530.

As illustrated, DBMS 510 comprises a transaction manager 512 and a lock manager 514. Transaction manager 512 is configured to perform one or more transactions and/or batches in response to request 502. Transaction manager 512 may initiate corresponding threads/processes to execute the transactions and/or batches. Lock manger 514 is configured to coordinate between the transactions and/or batches to grant locks for the transactions and/or batches.

It would also be appreciated that the components of DBMS 510 shown in FIG. 5 may be implemented as one or more software engines, components, or the like, which are configured with logic for implementing the functionality attributed to the particular module. Each component may be implemented using one or more such software engines, components or the like. The software engines, components, and the like are executed on one or more processors on one or more computing systems or devices and utilize or operate on data stored in one or more storage devices, memories, or the like, and/or on one or more computing system(s). Although illustrated as being comprised in DBMS 510, lock manger 514 may be implemented as an external lock manager for DBMS 510. The scope of the present disclosure is not limited in this regard.

As mentioned above, transactional processing may include a transaction or a batch of transactions. During execution of transaction processing, data in one or more data tables 530 may need to be accessed. Typically, a lock granularity to lock data in database 520 is based on lock granularity hierarchy 400 of FIG. 4.

Figure 6A:
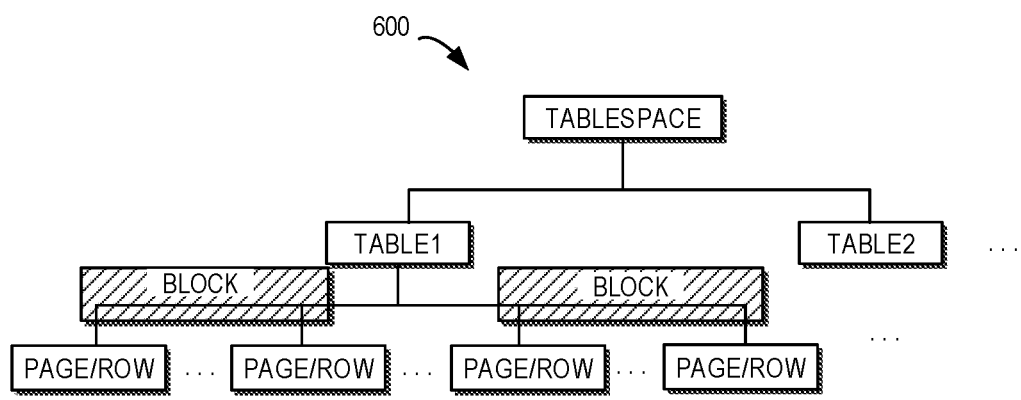
FIG. 6A depicts an example lock granularity hierarchy according to some embodiments of the present disclosure.

According to embodiments of the present disclosure, a new type of lock, referred to as a block lock, is introduced to lock a continuous range of data in a data table. In some examples, the continuous range of data may include a plurality of pages or rows in a plurality of pages of a data table. FIG. 6A depicts an example lock granularity hierarchy 600 applied in the database environment according to some embodiments of the present disclosure. As illustrated, a block level lock is introduced, which is coarser than the page/or row level lock but is finer than a table/table space level lock.

In operation, transaction manager 512 and lock manager 514 may be operated to utilize the block level lock in execution of transactional processing. Specifically, transaction manager 512 may receive a request 502 for transactional processing. Transaction manager 512 determines a data table 530 on which transactional processing is to be applied, and specifically determines target data of data table 530 to be accessed during execution of the transactional processing.

In some embodiments, transaction manager 512 may determine to request a block lock for the currently requested transactional processing in order to lock a continuous range of data in data table 530. This continuous range of data comprises at least the target data to be accessed by the current requested transactional processing. Transaction manager 512 may provide a lock request to lock manager 514 to request the block lock.

Lock manager 514 may receive lock requests of transactional processing from transaction manager 512, analyze the lock requests and provide (or deny) granting of locks on data in data tables 530 stored in database 520. Upon receipt of a lock request from transaction manager 512, lock manager 514 determines whether the block lock is available for locking the continuous range of data in the data table for transactional processing. Lock manager 514 may control lock grants, including block lock grants, based on various factors, which will be discussed in detail below.

In some embodiments, if a block lock for locking a continuous range of data table 530 is determined to be available for transactional processing, lock manager 514 may grant transactional processing with the block lock. To facilitate lock management, the block lock may be associated with lock information indicating the continuous range of data. The lock information may be used to identify a specific block lock among granted locks in a database. In some embodiments, lock manager 514 may store the lock information in its cache or other storage space.

Figure 6B:
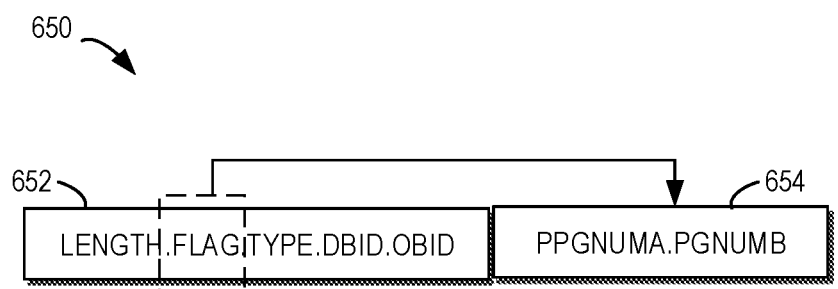
FIG. 6B depicts an example format of lock information for a block lock according to some embodiments of the present disclosure.

FIG. 6B depicts an example format 650 of lock information for a block lock according to some embodiments of the present disclosure. As illustrated, the format 650 of the lock information comprises a first information segment 652 and a second information segment 654. The format of the first information segment 652 may be reused from a format of a table lock, indicating information about a length of the continuous range of data, a flag for referring to detailed positioning information about the continuous range of data, a type indicator indicating a type of block lock, a database identity (DBID) indicating identity information about the database, and an object identity (OBID) indicating identity information about the table space. The flag in the first information segment 652 refers to the second information segment 654 which indicates a start page number and an end page number of the continuous range of data in the data table.

It would be appreciated that the example lock information in FIG. 6B is provided for the purpose of illustration only. The stored lock information may indicate the continuous range of data in a data table stored in database 520 in other ways, and other information related to the block lock may also be stored as lock information.

In some embodiments, in order to avoid a conflict with one or more granted requests, lock manager 514 may determine whether the block lock, to lock the specific continuous range of data, is available to be granted based on types of the requested block lock and one or more granted locks. Lock manager 514 may determine that the block lock is available to be granted for transactional processing if no lock is granted to lock the continuous range of data, or the block lock is compatible with a granted lock for locking at least a part of the continuous range of data.

In some embodiments, locks applicable in a database system may be of different types. Different types of locks may have different restrictions in order to have access to the locked data. For a page level lock and a row level lock (also referred to as child locks), example types of locks may include a share ("S") lock, an update ("U") lock, and an exclusive ("X") lock. The share lock allows an owner of the lock (to which the share lock is granted) to read the locked data, and also allows others to read the locked data. The update lock requires the owner of the lock to promote to an exclusive lock to update the locked data, and allows others to read the locked data. The exclusive lock allows a single owner to update the locked data and others cannot access the locked data. Therefore, if an exclusive lock is granted to lock a part of a data table, this part may be excluded from being granted with another lock.

For a table level lock and a table space level lock (also referred to as parent locks), example types of locks may also include the share ("S") lock, an update ("U") lock, and the exclusive ("X") lock. The share lock allows an owner of the lock (to which the share lock is granted) and others to read the locked data table or table space, and the exclusive lock allows the owner to only update the locked data table or table space. In addition, if at least a part of a data table or a table space is locked by one or more child locks, a degraded parent lock may be considered to be applied to the data table or the table space. Example types of such a parent lock may further include an intent share lock ("IS") lock applied in the case of one or more share child locks applied to a part of a data table or a table space, an intent exclusive lock ("IX") lock applied in the case of one or more exclusive child locks applied to a part of a data table or a table space, and a mixed lock mode, "SIX," lock applied in the case that a share lock is applied and an exclusive lock (having a share intent to others) will be requested to be applied to a part of a data table or a table space.

Depending on the lock types, in some cases, an additional lock may be granted even if a granted lock is applied on the same data. If locks of two types can be granted on the same data (a page(s), a row(s), a data table(s), or a table space), the locks of the two types may be considered to be compatible with each other.

Figures 7, 8:
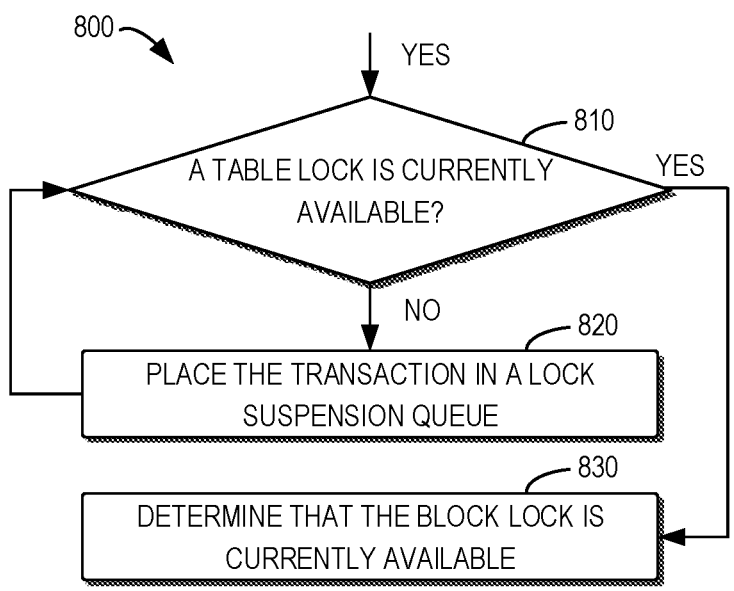
FIG. 7 depicts examples of lock compatibilities between different lock types according to some embodiments of the present disclosure.
FIG. 8 depicts a flowchart of a process for determining lock availability according to some embodiments of the present disclosure.

FIG. 7 depicts examples of lock compatibilities between different lock types according to some embodiments of the present disclosure. In FIG. 7, table 710 indicates lock compatibilities between different child lock types, and table 720 indicates lock compatibilities between different parent lock types. Lock manager 514 may determine whether a requested lock is available to be granted based on the lock compatibilities between different lock types. As an example, according to the lock compatibilities illustrated in the table 710 in FIG. 7, if an exclusive lock is granted to a page of a data table, no share lock, update lock, or exclusive lock can be granted to lock that page before the exclusive lock is released. According to the table 720 in FIG. 7, if an IX lock is granted to a part of a data table, an IS lock and an "IX" lock can still be granted to other parts of the same data table, but the share lock, update lock, exclusive lock, and a "SIX" lock cannot be applied to the same data table.

It would be appreciated that some example types of locks and their compatibilities are provided above. In other embodiments, one or more other and/or different types of locks and different compatibility requirements may be defined in other database systems.

In some embodiments, in order to effectively determine the lock compatibility of the requested block lock with one or more granted locks, lock manager 514 may test whether a table lock can be granted for transactional processing which requests the block lock. FIG. 8 depicts a flowchart of process 800 for determining lock availability according to some embodiments of the present disclosure. Process 800 may be implemented at DBMS 514, or more specifically, at lock manager 514.

At block 810, lock manager 514 determines whether a table lock is currently available for locking data table 530 for transactional processing which requests a block lock. In some embodiments, one type of table lock may be the same as another type of block lock and/or may include a child type of block lock. The S, U, X child lock types may be considered to be the same as the S, U, X parent lock types, and the S and X child lock types may be considered to be included by the IS and IX parent lock types. For example, if the block lock is an X block lock requesting to exclusively locking the contiguous range of data for transactional processing, lock manager 514 may determine whether an X table lock is currently available for locking data table 530.

Lock manager 514 may determine whether the table lock is currently available based on the lock compatibilities between the table lock and one or more granted locks (which may be a child lock or a parent lock of any lock types). As such, the lock compatibilities defined for the conventional lock granularity may be reused when the block lock is introduced, to assure data consistency. Lock manager 514 may determine whether the table lock is available based on the example lock compatibilities as illustrated in FIG. 7.

Figure 9:
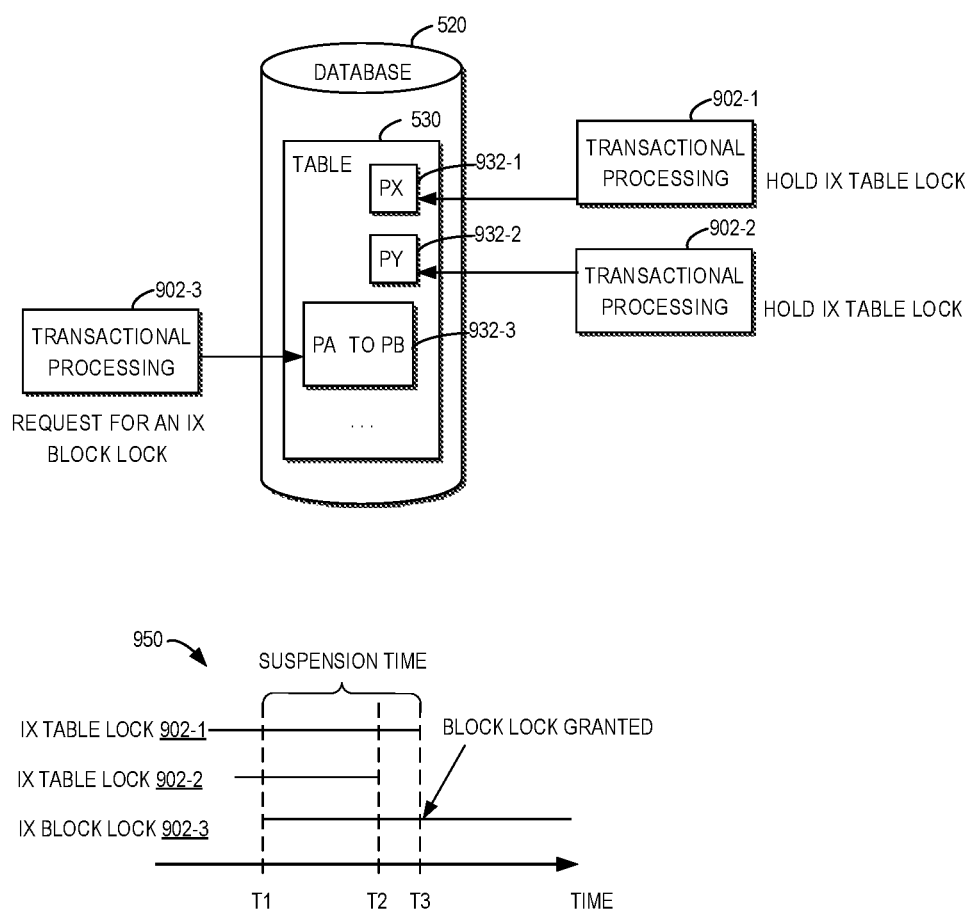
FIG. 9 depicts example transaction processing on a data table according to some embodiments of the present disclosure.

FIG. 9 depicts example transaction processing on a data table according to some embodiments of the present disclosure. As illustrated in FIG. 9, transactional processing 902-1, which is currently executed to access page 932-1 (Px) included in data table 530, is an owner holding an IX table lock granted by lock manager 514, to lock page 932-1. Transactional processing 902-2, which is currently executed to access page 932-2 (Py) included in data table 530, is an owner holding an IX table lock granted by lock manager 514, to lock page 932-2.

As illustrated by timeline 950, transactional processing 902-3 is requested to be executed and an exclusive ("X") block lock is requested at T1 to lock continuous range 932-3 of data including a page range from "PA" to "PB". Lock manager 513 may determine whether an X table lock for locking the whole data table 530 is available for transactional processing 902-3.

Referring back to FIG. 8, if the table lock is currently unavailable, at block 820, lock manager 514 places transactional processing into a lock suspension queue to wait for the table lock. The table lock is unavailable because one or more granted and incompatible locks are not released. The granted lock(s) may be configured to lock the whole data table or a part of the data table.

In the illustrated example of FIG. 9, due to the presence of the IX table locks for transactional processing 902-1 and 902-2 at T1, the X block lock is not compatible with the IX table lock, where lock manager 514 determines that the X table lock is unavailable at T1. Transactional processing 902-3 is placed in a lock suspension queue to wait for the X table lock to become available.

As illustrated by timeline 950, the IX table lock for transactional processing 902-2 is released at T2, but at this time the X table lock for locking data table 530 is still unavailable. At T3, when the IX table lock for transactional processing 902-1 is released, lock manager 514 determines that the X table lock is available for transactional processing 902-3.

At block 830 of process 800, if the table lock is available for transactional processing, lock manager 514 determines that the block lock is also available for transactional processing. For example, lock manager 514 may determine the block lock is also available for transactional processing 902-3 at T3 in the example of FIG. 9, and may grant transactional processing 902-3 with a block lock to locking the continuous range 932-3 of data. Thus, transactional processing 902-3 has a suspension time from T1 to T3 before obtaining the block lock.

In some embodiments, lock manager 514 may grant transactional processing with the available table lock and then degrade the available table lock to be the block lock, so as to degrade the lock granularity applied on data table 530. For example, in FIG. 9, lock manager 514 may grant transactional processing 902-3 with the X table lock at T3 and then degrade the X table lock to be an IX type of block lock.

It would be appreciated that although one block lock is described in the above example embodiment, two or more block locks for one or more data tables in a database may also be granted. By locking a relatively large amount of data in a continuous range for certain transactional processing, the transaction performance can be improved, as the overhead for requesting and releasing locks for individual pages or rows can be decreased. In addition, it is possible that other data in the data table can still be accessed by other transactional processing.

In some embodiments, if the block lock for transactional processing has been granted to lock the continuous range of data in data table 530, and a request 402 for further transactional processing is received at DBMS 510, transaction manager 512 may process further transactional processing by determining target data of data table 530 to be accessed during the execution of further transactional processing. If the same data table 530 as the transactional processing with the block lock is granted, transaction manager 512 may determine whether target data to be accessed by further transactional processing falls into the continuous range of data.

In some embodiments, transaction manager 512 may have the block information indicating the continuous range of data locked by the block lock. Transaction manager 512 may determine whether target data falls into the continuous range of data based on the block lock. In some embodiments, transaction manager 512 may transmit a request for a block lock to lock the target data for the further transactional processing to lock manager 514, to cause lock manager 514 to determine whether the target data falls into the continuous range of data based on the granted block lock and then determine whether the block lock can be granted.

If the target data falls outside the continuous range of data locked by the block lock, transaction manager 512 may request lock manager 514 to grant further transactional processing with a lock to lock at least the second target data, without waiting for the block lock to be released. Lock manager 514 may perform the lock grant based on its granting policy. The lock may be granted to further transactional processing without waiting for the block lock to be released.

Figure 10A:
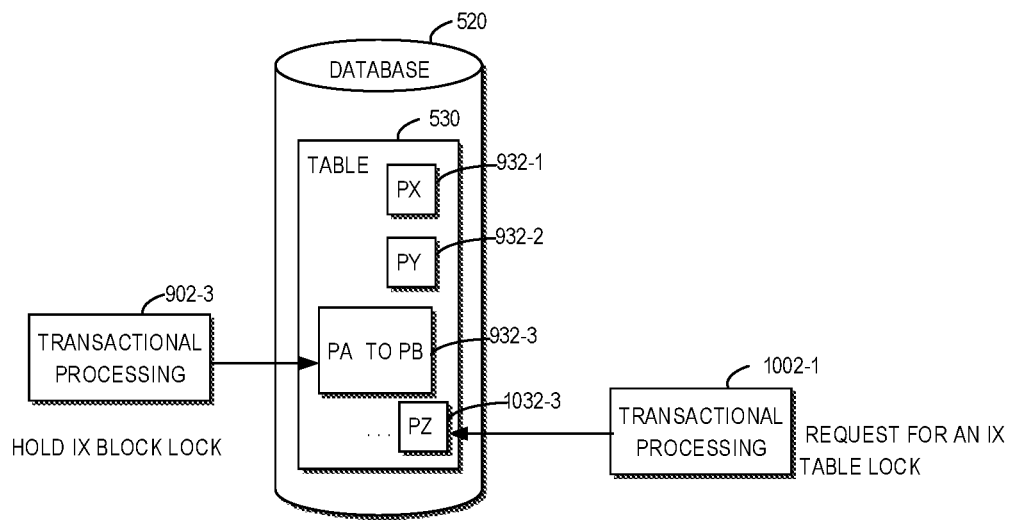
FIGS. 10A-10B depict example batch/transaction processes according to some embodiments of the present disclosure.
Figure 10A:
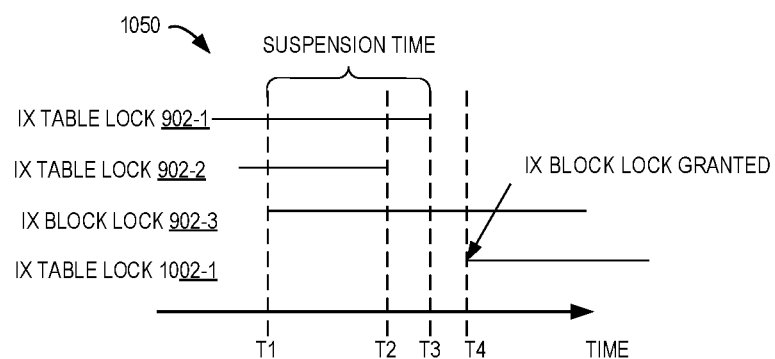

FIG. 10A depict an execution example of transactional processing on a data table 530 according to some embodiments of the present disclosure. As shown, following transactional processing 1002-1, processing is requested at T4 of timeline 1050. Transaction manager 512 determines that transactional processing 1002-1 will have access to page ("Pz") 1032-3 in data table 530, which is not included in the page range in the continuous range 932-3 of the data. Transaction manager 512 may transmit a request for an IX table lock to lock manager 514. Lock manager 514 may grant the IX table lock for transactional processing 1002-1 at T4 or after T4 without waiting for the IX block lock granted for transactional processing 902-1 to be released. As such, transaction concurrency on the data table can be improved.

In some embodiments, the lock to be granted for the further transactional processing may be compatible with the block lock that has been granted for the previous transactional processing. For example, an IX table lock for transactional processing 1002-1 is compatible for the IX block lock granted for transactional processing 902-3 in FIG. 9. Lock manger 514 may take the lock compatibilities into account when granting the lock(s) for follow on transactional processing.

In some embodiments, for the same transactional processing (for example, transactional processing 902-1), a block lock may not be able to lock all the data to be accessed during execution of transactional processing. In such a case, one or more further block locks or other locks (page/row locks) may be further granted to transactional processing.

Specifically, during execution of transactional processing, if further target data outside the continuous range of data in the data table is to be accessed, the block lock locking the continuous range of data may be released. A further block lock may be attempted to be granted to transactional processing if further target data is comprised in a further continuous range of the data table. Otherwise, a lock(s) of other granularity level, such as a table lock, a table space lock, and/or one or more page or row locks, may be granted to lock at least the further target data.

Figure 10B:
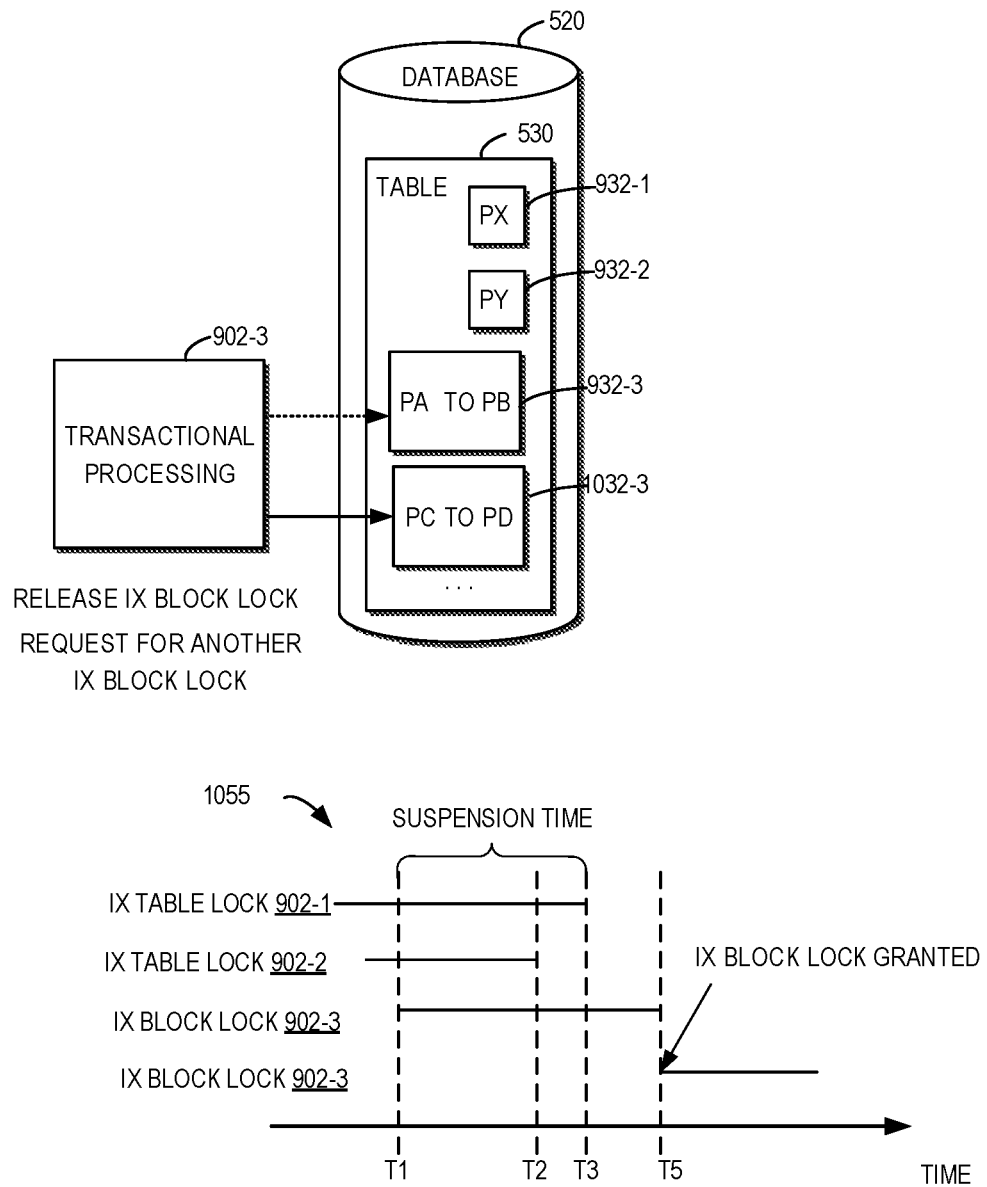

FIG. 10B depicts an example of granting a further lock for transitional processing 902-3 which has been granted with the block lock. As illustrated, during execution of transitional processing 902-3, it is found that a further continuous range 1032-3 of data including a page range from "PC" to "PD" is to be accessed by transitional processing 902-3.

In such a case, if the access to the continuous range 932-3 of data has been completed, transaction manager 512 may request lock manager 514 to release the IX block lock that locks the continuous range 932-3 of data at T5 of timeline 1055 as illustrated in FIG. 10B. Transaction manager 512 may further request lock manager 514 to grant a further IX block lock to lock the continuous range 1032-3 of data. Lock manager 514 may determine whether and when the further IX block lock can be granted or not in a similar way as the granting of the IX block lock that locks the continuous range 932-3 of data. In the illustrated example of FIG. 10B, the further IX block lock is granted at T5 to transitional processing 902-3 to lock the continuous range 1032-3 of data. Transitional processing 902-3 may be further executed to access the continuous range 1032-3 of data.

In some embodiments, the commit interval for transitional processing may be adjusted implicitly if transitional processing needs to further access target data which is not locked by the granted block lock. For example, in FIG. 10B, transaction manager 512 may trigger a commit of transactional processing 902-3 before releasing the IX block lock on the continuous range 932-3 of data. As such, the partial execution on continuous range 932-3 of data can be committed.

In the above described embodiments, a block lock is introduced and can be granted to lock a continuous range of data in a data table. In some embodiments, such a dynamic granularity of locks may be enabled or disabled for different transactions/batches or for different database systems. In some embodiments, before requesting a block lock for certain transactional processing, transaction manager 512 may further determine whether a grant of a block lock is allowed or enabled for transactional processing. The block lock can be granted in the case where such a grant is allowed.

Figure 11:
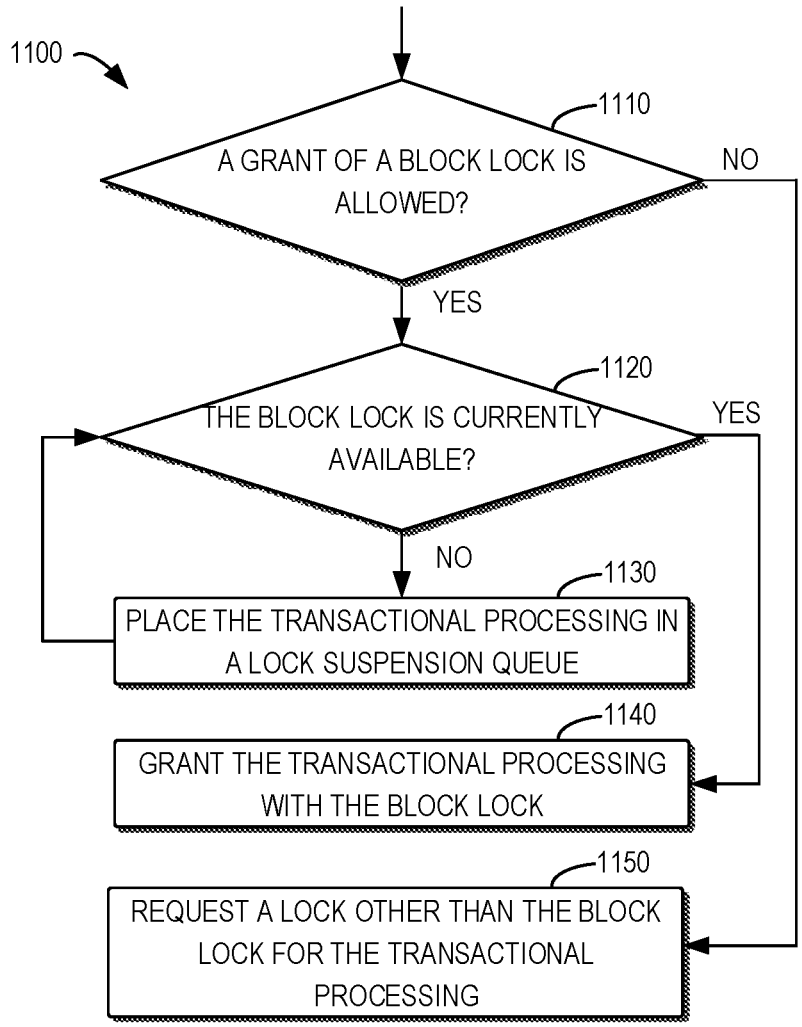
FIG. 11 depicts a flowchart of a process for granting a block lock based on lock availability according to some embodiments of the present disclosure.

FIG. 11 depicts a flowchart of a process 1100 for granting a block lock based on lock availability according to some embodiments of the present disclosure. Process 1100 may be implemented at DBMS 510, by both transaction manager 512 and lock manager 514.

At block 1110, DBMS 510 (for example, transaction manager 512) determines whether a continuous range of data is to be locked for transactional processing to be executed. It is expected that the more sequential data being accessed in a data table, the more benefits the transactional processing can have from using a block lock. Transaction manager 512 may detect the continuous range of data to be locked for transactional processing in various ways.

In some embodiments, transaction manager 512 may check one or more data query statements defined for transactional processing. The data query statement may, for example, be written according to a query language for database 520. In some examples, the data query statement may include a structured query language (SQL) statement. In some embodiments, the data query statement may explicitly state locking a continuous range of data (for example, a continuous range of page numbers in a data table). Such a data query statement may be, for example, input by the users. Based on more data query statement(s), transaction manager 512 may determine whether or not transactional processing is to be executed to access the continuous range of data, and thus this range of data may be locked in order to improve transaction performance.

In some embodiments, transaction manager 512 may gather other information to determine if there are potential candidate ranges in a data table 530 for block locks. In some examples, transaction manager 512 may obtain information on historical execution of the transactional processing on data table 530. The information may include runtime information of the transactional processing, lock granularity granted to the transactional processing during the historical execution, and/or access path information generated for the historical execution of the transactional processing.

Figure 12:
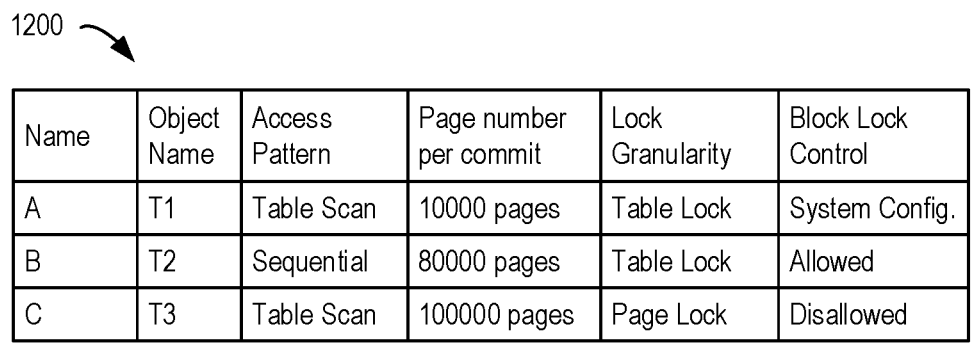
FIG. 12 depicts example information collected for determining allowance of a block lock according to some embodiments of the present disclosure.

FIG. 12 depicts example information 1200 collected for determining allowance of a block lock according to some embodiments of the present disclosure. As illustrated, for transactional processing with names "A," "B," and "C," "object name" indicates the names of the data tables on which the transactional processing is applied, "access pattern" indicates whether data is accessed in a sequential manner or through a table scan operation, "page number per commit" indicates the average number of accessed pages per commit, and "lock granularity" indicates a lock granularity applied during the historical execution. The column of "block lock control" indicates whether a grant of a block lock is enabled or not for certain transactional processing based on the collected information.

In some embodiments, if the collected information indicates that a table scan operation is generally applied to access the data table during the historical execution of transactional processing, transaction manager 512 may determine that it is beneficial to grant a block lock for transactional processing. In some examples, the table scan operation applied in the historical execution may be determined from the pre-fetching instructions and/or access type information in the access path information and/or runtime information.

In some embodiments, alternatively, or in addition, transaction manager 512 may take the length of a historical continuous range of data accessed during the historical execution into account. The length of a historical continuous range may be measured by the number of accessed pages per commit. In some examples, the runtime information may indicate the number of accessed pages in one or more commits and the average number of accessed pages per commit may then be calculated accordingly. In some embodiments, if a length of a historical continuous range of data accessed during the historical execution is higher than a threshold length, transaction manager 512 may determine that it is beneficial to grant a block lock for transactional processing.

In some embodiments, alternatively, or in addition, transaction manager 512 may determine whether a table lock and/or a table space lock were granted for transactional processing during the historical execution. The block granularity granted during the historical execution may be collected from the access path information, for example, from information indicating the lock rule for transactional processing. The lock rule may indicate whether a table lock, a table space lock, a page lock, or a row lock is to be granted for transactional processing. If the table lock and/or the table space lock were granted, transaction manager 512 may determine that it is beneficial to grant a block lock for transactional processing.

In some embodiments, if transactional processing requires a data insertion operation and data table 530 is defined with appending data in the case of data insertion, it means that new data will be appended to the end of the data table. In such a case, a continuous range of data from the end of the data table may also be locked for transactional processing. Thus, transaction manager 512 may determine that it is beneficial to grant a block lock if the transactional processing requests a data insertion operation to append data to the data table during the historical execution.

Transaction manager 512 may utilize one or more of the above factors to determine whether a continuous range of data is to be locked during execution of transactional processing. One or more other factors may also be applied if appropriate. In the example of FIG. 12, it is indicated that the block lock is allowed for transitional processing "B" and is disallowed for transitional processing "C." For transitional processing "A," it depends on system configuration to determine whether a grant of a block lock is allowed or not.

Referring back to FIG. 11, if the continuous range of data is to be locked, DBMS 510 determines that a grant of a block lock is allowed for transactional processing. Then at block 1120, DBMS 510 determines whether the block lock is currently available for transactional processing. As discussed above with reference to the embodiments of FIG. 8, transaction manager 512 may request lock manager 514 for the block lock and lock manager 514 may determine whether the block lock is currently available to be granted or whether the transactional processing needs to wait for the block lock.

In some embodiments, if the block lock is unavailable at block 1130, lock manager 514 places the transactional processing in a lock suspension queue. For example, while determining the availability of the block lock, if the table lock is not available as determined at block 820, transactional processing is in the lock suspension queue. When the table lock is available, the block lock is also available. In some other embodiments, the availability of the block lock does not depend on a table lock. Lock manager 514 may directly determine whether there is any lock conflict or compatibility issue on the continuous range of data directly based on the compatibilities of the block lock with other locks. The block lock may be considered as a collection of page locks and/or row locks. The compatibilities of the block lock with other locks may be based on the compatibilities of the collection of pages and/or row locks and other locks.

If it is determined that the block lock is also available at block 1140, lock manager 514 grants the current transactional processing with the block lock. With the block lock granted, transactional processing may be executed to access data in the locked continuous range.

In some embodiments, if it is determined at block 1110 that a grant of a block lock is not allowed for transactional processing at block 1150, transition manager 512 may request and lock manager 514 may grant a lock other than the block lock for transactional processing. Such a lock may include a table lock, a table space lock, one or more page locks, and/or one or more row locks. The granting of other types of locks is not limited in this regard.

Figure 13:
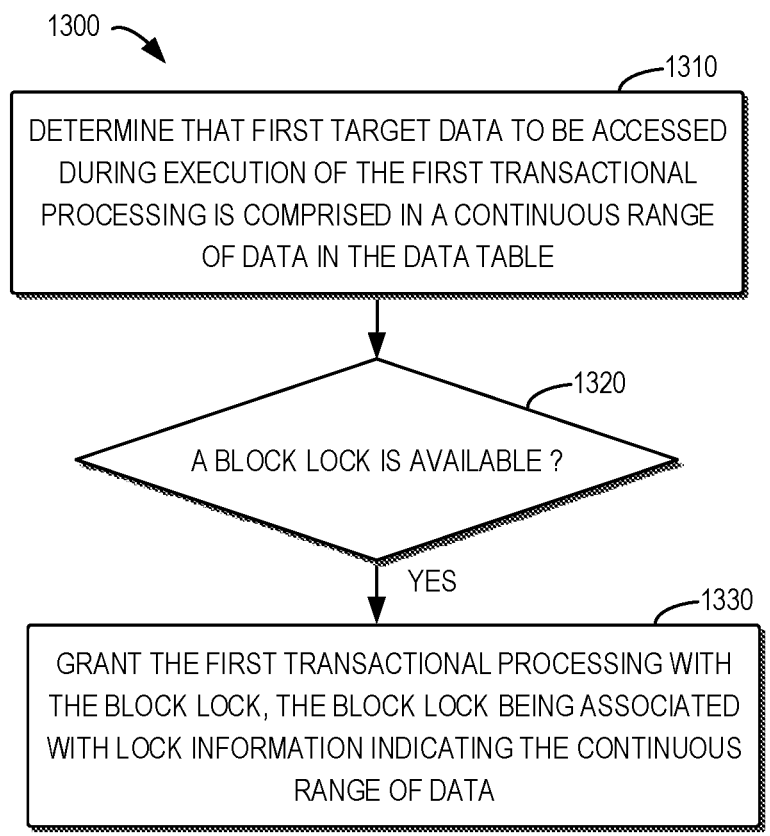
FIG. 13 depicts a flowchart of an example process according to some embodiments of the present disclosure.

FIG. 13 shows a flowchart of an example method 1300 according to some embodiments of the present disclosure. The method 1300 can be implemented at DBMS 510 of FIG. 5. For the purpose of discussion, method 1300 will be described from the perspective of DBMS 510 with reference to FIG. 5.

At block 1310, in response to first transactional processing to be applied on a data table, DBMS 510 determines that first target data to be accessed during execution of the first transactional processing is comprised in a continuous range of data in the data table. At block 1320, DBMS 510 determines whether a block lock is available for locking the continuous range of data for the first transactional processing. At block 1330, in accordance with a determination that the block lock is available, DBMS 510 grants the first transactional processing with the block lock, the block lock being associated with lock information indicating the continuous range of data.

In some embodiments, the method 1300 further comprises, in response to second transactional processing to be applied on the data table, determining second target data of the data table to be accessed during the execution of the second transactional processing; determining whether the second target data falls into the continuous range of data based on the lock information; and in accordance with a determination that the second target data falls outside the continuous range of data, granting the second transactional processing with a lock to lock at least the second target data, the lock being compatible with the block lock.

In some embodiments, determining whether the block lock is available comprises: determining whether a table lock is available for locking the data table for the first transactional processing; in accordance with a determination that the table lock is unavailable for the first transactional processing, placing the first transactional processing into a lock suspension queue to wait for the table lock; and in accordance with a determination that the table lock is available for the first transactional processing, determining that the block lock is available for the first transactional processing.

In some embodiments, the method 1300 further comprises determining whether the continuous range of data is to be locked for the first transactional processing based on at least one of the following: a data query statement defined for the first transactional processing, and information on historical execution of the first transactional processing on the data table; in accordance with a determination that the continuous range of data is to be locked, determining that a grant of a block lock is allowed for the first transactional processing.

In some embodiments, determining whether the block lock is available for the first transactional processing comprises: in accordance with a determination that the grant of the block lock is allowed, determining whether the block lock is available.

In some embodiments, determining whether the continuous range of data is to be locked for the first transactional processing comprises: determining that the continuous range of data is to be locked for the first transactional processing based on at least one of the following: the data query statement indicating that the continuous range of data is to be locked, a table scan operation applied to access the data table during the historical execution, a length of a historical continuous range of data accessed during the historical execution being higher than a threshold length, a table lock granted for the first transactional processing during the historical execution, a table space lock granted for the first transactional processing during the historical execution, and a data insertion operation to append data to the data table during the historical execution.

In some embodiments, the method 1300 further comprises in accordance with a determination that third target data outside the continuous range of data in the data table is to be accessed during the execution of the first transactional processing, releasing the block lock; and granting the first transactional processing with a further lock to lock at least the third target data.

In some embodiments, the method 1300 further comprises, in accordance with a determination that the third target data is to be accessed, triggering a commit of the first transactional processing before releasing the block lock.

In some embodiments, the first transactional processing comprises a batch of transactions.

It should be noted that the lock management processing and/or DBMS 410, according to embodiments of this disclosure, could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a data table that includes a first continuous range of data;
    receiving a request to perform first transactional processing on the data table, with the request including information indicative of first target data to be accessed during performance of the first transactional processing;
    in response to receipt of the request, determining, by one or more processors, that first target data to be accessed during execution of the first transactional processing is included in the first continuous range of data in the data table;
    determining, by one or more processors, that a block lock is available for locking the first continuous range of data to permit performance of the first transactional processing;
    responsive to the determination that the block lock is available, performing, by one or more processors, the first transactional processing using the block lock; and
    storing, in a manner associated the block lock, lock information indicating information indicative of the first continuous range of data.

2. The method of claim 1, further comprising:
    in response to second transactional processing to be applied on the data table, determining, by one or more processors, second target data of the data table to be accessed during the execution of the second transactional processing;
    determining, by one or more processors, that the second target data falls into the first continuous range of data based on the lock information; and
    responsive to the determination that the second target data falls outside the continuous range of data, granting, by one or more processors, the second transactional processing with a lock to lock at least the second target data, the lock being compatible with the block lock.

3. The method of claim 1, wherein the determination that the block lock is available includes:
    determining, by one or more processors, that a table lock is available for locking the data table for the first transactional processing;
    placing, by one or more processors, the first transactional processing into a lock suspension queue to wait for the table lock; and
    determining, by one or more processors, that the block lock is available for the first transactional processing.

4. The method of claim 1, further comprising:
    determining, by one or more processors, that the first continuous range of data is to be locked for the first transactional processing based on at least one of the following: a data query statement defined for the first transactional processing, and information on historical execution of the first transactional processing on the data table;
    responsive to the determination that the first continuous range of data is to be locked, determining, by one or more processors, that a grant of a block lock is allowed for the first transactional processing; and
    wherein the determination that the block lock is available for the first transactional processing includes:
        responsive to the determination that the grant of the block lock is allowed, determining, by one or more processors, that the block lock is available.

5. The method of claim 4, wherein the determination that the continuous range of data is to be locked for the first transactional processing includes:
    determining, by one or more processors, that the continuous range of data is to be locked for the first transactional processing based on at least one of the following:
        the data query statement indicating that the continuous range of data is to be locked,
        a table scan operation applied to access the data table during the historical execution,
        a length of a historical continuous range of data accessed during the historical execution being higher than a threshold length,
        a table lock granted for the first transactional processing during the historical execution,
        a table space lock granted for the first transactional processing during the historical execution, and
        a data insertion operation to append data to the data table during the historical execution.

6. The method of claim 1, further comprising:
in accordance with a determination that third target data outside the continuous range of data in the data table is to be accessed during the execution of the first transactional processing,
releasing, by one or more processors, the block lock; and
granting, by one or more processors, the first transactional processing with a further lock to lock at least the third target data.

7. A computer program product (CPP) comprising:
a set of storage device(s); and
computer code stored collectively in the set of storage device(s), with the computer code including data and instructions to cause a processor(s) set to perform at least the following operations:
receiving a data table that includes a first continuous range of data,
receiving a request to perform first transactional processing on the data table, with the request including information indicative of first target data to be accessed during performance of the first transactional processing,
in response to receipt of the request, determining, by one or more processors, that first target data to be accessed during execution of the first transactional processing is included in the first continuous range of data in the data table,
determining, by one or more processors, that a block lock is available for locking the first continuous range of data to permit performance of the first transactional processing,
responsive to the determination that the block lock is available, performing, by one or more processors, the first transactional processing using the block lock, and
storing, in a manner associated the block lock, lock information indicating information indicative of the first continuous range of data.

8. The computer program product of claim 7, wherein the computer code further includes instructions for causing the processor(s) set to perform the following operation(s):
in response to second transactional processing to be applied on the data table, determining, by one or more processors, second target data of the data table to be accessed during the execution of the second transactional processing;
determining, by one or more processors, that the second target data falls into the first continuous range of data based on the lock information; and
responsive to the determination that the second target data falls outside the continuous range of data, granting, by one or more processors, the second transactional processing with a lock to lock at least the second target data, the lock being compatible with the block lock.

9. The computer program product of claim 7, wherein the determination that the block lock is available includes:
determining, by one or more processors, that a table lock is available for locking the data table for the first transactional processing;
placing, by one or more processors, the first transactional processing into a lock suspension queue to wait for the table lock; and
determining, by one or more processors, that the block lock is available for the first transactional processing.

10. The computer program product of claim 7, wherein the computer code further includes instructions for causing the processor(s) set to perform the following operation(s):
determining, by one or more processors, that the first continuous range of data is to be locked for the first transactional processing based on at least one of the following: a data query statement defined for the first transactional processing, and information on historical execution of the first transactional processing on the data table;
responsive to the determination that the first continuous range of data is to be locked, determining, by one or more processors, that a grant of a block lock is allowed for the first transactional processing; and
wherein the determination that the block lock is available for the first transactional processing includes:
responsive to the determination that the grant of the block lock is allowed, determining, by one or more processors, that the block lock is available.

11. The computer program product of claim 10, wherein the determination that the continuous range of data is to be locked for the first transactional processing includes:
determining, by one or more processors, that the continuous range of data is to be locked for the first transactional processing based on at least one of the following:
the data query statement indicating that the continuous range of data is to be locked,
a table scan operation applied to access the data table during the historical execution,
a length of a historical continuous range of data accessed during the historical execution being higher than a threshold length,
a table lock granted for the first transactional processing during the historical execution,
a table space lock granted for the first transactional processing during the historical execution, and
a data insertion operation to append data to the data table during the historical execution.

12. The computer program product of claim 7, wherein the computer code further includes instructions for causing the processor(s) set to perform the following operation(s):
in accordance with a determination that third target data outside the continuous range of data in the data table is to be accessed during the execution of the first transactional processing,
releasing, by one or more processors, the block lock; and
granting, by one or more processors, the first transactional processing with a further lock to lock at least the third target data.

13. A computer system (CS) comprising:
a processor(s) set;
a set of storage device(s); and
computer code stored collectively in the set of storage device(s), with the computer code including data and instructions to cause the processor(s) set to perform at least the following operations:
receiving a data table that includes a first continuous range of data,
receiving a request to perform first transactional processing on the data table, with the request including information indicative of first target data to be accessed during performance of the first transactional processing,
in response to receipt of the request, determining, by one or more processors, that first target data to be accessed during execution of the first transactional processing is included in the first continuous range of data in the data table, determining, by one or more processors, that a block lock is available for locking the first continuous range of data to permit performance of the first transactional processing, responsive to the determination that the block lock is available, performing, by one or more processors, the first transactional processing using the block lock, and storing, in a manner associated the block lock, lock information indicating information indicative of the first continuous range of data.

14. The computer system of claim 13, wherein the computer code further includes instructions for causing the processor(s) set to perform the following operation(s):

in response to second transactional processing to be applied on the data table, determining, by one or more processors, second target data of the data table to be accessed during the execution of the second transactional processing;

determining, by one or more processors, that the second target data falls into the first continuous range of data based on the lock information; and responsive to the determination that the second target data falls outside the continuous range of data, granting, by one or more processors, the second transactional processing with a lock to lock at least the second target data, the lock being compatible with the block lock.

15. The computer system of claim 13, wherein the determination that the block lock is available includes:

determining, by one or more processors, that a table lock is available for locking the data table for the first transactional processing;

placing, by one or more processors, the first transactional processing into a lock suspension queue to wait for the table lock; and determining, by one or more processors, that the block lock is available for the first transactional processing.

16. The computer system of claim 13, wherein the computer code further includes instructions for causing the processor(s) set to perform the following operation(s):

determining, by one or more processors, that the first continuous range of data is to be locked for the first transactional processing based on at least one of the following: a data query statement defined for the first transactional processing, and information on historical execution of the first transactional processing on the data table;

responsive to the determination that the first continuous range of data is to be locked, determining, by one or more processors, that a grant of a block lock is allowed for the first transactional processing; and wherein the determination that the block lock is available for the first transactional processing includes:

responsive to the determination that the grant of the block lock is allowed, determining, by one or more processors, that the block lock is available.

17. The computer system of claim 16, wherein the determination that the continuous range of data is to be locked for the first transactional processing includes:

determining, by one or more processors, that the continuous range of data is to be locked for the first transactional processing based on at least one of the following:

the data query statement indicating that the continuous range of data is to be locked, a table scan operation applied to access the data table during the historical execution, a length of a historical continuous range of data accessed during the historical execution being higher than a threshold length, a table lock granted for the first transactional processing during the historical execution, a table space lock granted for the first transactional processing during the historical execution, and a data insertion operation to append data to the data table during the historical execution.

18. The computer system of claim 13, wherein the computer code further includes instructions for causing the processor(s) set to perform the following operation(s):

in accordance with a determination that third target data outside the continuous range of data in the data table is to be accessed during the execution of the first transactional processing, releasing, by one or more processors, the block lock; and granting, by one or more processors, the first transactional processing with a further lock to lock at least the third target data.

* * * * *